US012044186B1

(12) United States Patent
Svensson et al.

(10) Patent No.: US 12,044,186 B1
(45) Date of Patent: Jul. 23, 2024

(54) DUAL FUEL ENGINE OPERATING METHOD AND CONTROL STRATEGY FOR OPTIMIZED HEAT RELEASE

(71) Applicant: Caterpillar Inc., Peoria, IL (US)

(72) Inventors: Kenth I. Svensson, Peoria, IL (US); Jonathan W. Anders, Peoria, IL (US); Yongli Qi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/526,619

(22) Filed: Dec. 1, 2023

(51) Int. Cl.
*F02D 19/06* (2006.01)
*F02D 41/00* (2006.01)

(52) U.S. Cl.
CPC ....... *F02D 19/061* (2013.01); *F02D 41/0025* (2013.01)

(58) Field of Classification Search
CPC ........................... F02D 41/0025; F02D 19/061
See application file for complete search history.

(56) References Cited

U.S. PATENT DOCUMENTS

| | | |
|---|---|---|
| 7,287,492 B2 | 10/2007 | Leone et al. |
| 8,522,749 B2 | 9/2013 | Surnilla et al. |
| 8,701,630 B2 | 4/2014 | Surnilla et al. |
| 9,261,053 B2 | 2/2016 | Jacob |
| 10,323,586 B1* | 6/2019 | Atterberry ............ F02D 19/081 |
| 10,815,441 B2 | 10/2020 | Morris et al. |
| 11,143,137 B1* | 10/2021 | Kim ..................... F02D 13/0234 |
| 11,639,698 B1* | 5/2023 | Schroeder ............. F02D 41/146 123/305 |
| 2015/0192497 A1* | 7/2015 | Gregory ................ F02D 35/023 73/114.08 |
| 2020/0271068 A1* | 8/2020 | Dodis ................ F02D 19/0642 |

FOREIGN PATENT DOCUMENTS

| | | |
|---|---|---|
| WO | 2015058241 A1 | 4/2015 |
| WO | 2023200588 A1 | 10/2023 |

* cited by examiner

*Primary Examiner* — Kevin A Lathers
(74) *Attorney, Agent, or Firm* — Brannon Sowers & Cracraft PC

(57) ABSTRACT

Operating an engine system includes autoigniting a first fuel including a plurality of liquid fuels premixed with air, to trigger ignition of a direct-injected main fuel in a first engine cycle, and receiving data indicative of an undesired heat release of combustion of the first fuel. The undesired heat release may include an undesired heat release rate (HRR) modality such as a multistage combustion. Relative amounts of the plurality of the liquid fuels are varied and admitted to the cylinder in a second engine cycle, and the first fuel having the varied relative amounts autoignited to trigger ignition of the direct-injected main fuel in the second engine cycle. The undesired heat release can be limited in the second engine cycle based on the varied relative amounts of the liquid fuels. The first fuel may include a blend of dimethyl ether (DME), methanol (MeOH), and water. The direct-injected main fuel may include MeOH and water. Related apparatus and control logic is also disclosed.

20 Claims, 4 Drawing Sheets

DUAL FUEL ENGINE OPERATING METHOD AND CONTROL STRATEGY FOR OPTIMIZED HEAT RELEASE

FEDERALLY SPONSORED RESEARCH OR DEVELOPMENT

This invention was made with government support under Umbrella CRADA SC16/01875.00.00. The government has certain rights in the invention.

TECHNICAL FIELD

The present disclosure relates generally to operating an engine system on dual fuels, and more particularly to optimizing a heat release rate (HRR) of an autoignited first fuel pre-mixed with air to trigger ignition of a direct-injected main fuel.

BACKGROUND

Internal combustion engine systems are used the world over for production of electrical power, pressurization and/or transport of liquids and gases, and of course vehicle propulsion. Internal combustion engines employ a well-known process of igniting a fuel and air in an engine cylinder to produce a rapid pressure and temperature rise that drives a piston coupled to a rotatable crankshaft. In recent years, increasingly stringent emissions standards have motivated research and development in alternatives to traditional fossil fuels. So-called alternative fuels theoretically produce reduced levels of certain undesired emissions including oxides of nitrogen, particulate matter, and greenhouse gases at least under certain conditions.

A well-known platform that has experienced considerable technical and commercial success is a dual fuel engine, typically employing a relatively small quantity of a first fuel to ignite a larger quantity of a main fuel. A classic example of a dual fuel engine employs a small pilot injection of diesel fuel directly into a cylinder where the diesel autoignites to trigger ignition of a main charge of a gaseous fuel such as natural gas. In an effort to further improve upon traditional dual fuel strategies, engineering efforts have accelerated in relation to alternative fuels such as alcohol fuels, hydrogen, ether, and still others.

While many engine platforms can theoretically operate on various different fuel types, even seemingly minor changes to fuel composition can radically alter the necessary controls, timing of engine operating events, and even optimal engine hardware that is needed to comply with applicable standards for emissions, efficiency, and certainly cost. International patent application publication WO 2023200588A1 to Schroeder et al. is directed to a compression-ignited dual liquid fuel system and control strategy for flexible fuel operation.

SUMMARY

In one aspect, a method of operating an engine system includes autoigniting a first fuel including a plurality of liquid fuels premixed with air, in a cylinder in an engine, to trigger ignition of a direct-injected main fuel in a first engine cycle. The method further includes receiving data indicative of an undesired heat release of combustion of the first fuel in the first engine cycle, and varying, based on the data, relative amounts of the plurality of liquid fuels premixed with air and admitted to the cylinder in the second engine cycle. The method still further includes autoigniting the first fuel having the varied relative amounts of the plurality of liquid fuels in the cylinder, to trigger ignition of the direct-injected main fuel in the cylinder in the second engine cycle.

In another aspect, an engine system includes an engine having therein a cylinder, and an intake port extending to the cylinder. The engine system further includes a fuel system having a first fuel supply of a first fuel including a plurality of liquid fuels, a first fuel injector fluidly connected to the first fuel supply and arranged to inject the first fuel into a stream of intake air fed through the intake port, a second fuel supply of a main fuel to be ignited via autoignition of the first fuel, a direct fuel injector fluidly connected to the second fuel supply, and a fueling control unit. The fueling control unit is structured to receive data indicative of an undesired heat release of combustion of the first fuel in a first engine cycle, and to vary, based on the data, relative amounts of the plurality of liquid fuels injected into the stream of intake air in a second engine cycle. The fueling control unit is further structured to reduce the undesired heat release of combustion of the first fuel in the second engine cycle based on the varied relative amounts of the plurality of liquid fuels.

In still another aspect, a fuel system includes a first fuel supply for a first fuel including a plurality of liquid fuels, and a first fuel injector fluidly connected to the first fuel supply to inject the first fuel at a first injection location into a stream of intake air fed to a cylinder in an engine. The fuel system further includes a second fuel supply for a main fuel, and a direct fuel injector fluidly connected to the second fuel supply to directly inject the main fuel at a direct injection location into the cylinder. The fuel system still further includes a fueling control unit structured to determine an undesired heat release rate (HRR) of the first fuel autoignited in the cylinder, and to output a fuel composition control command to increase a relative amount of one of the plurality of liquid fuels admitted to the cylinder in a second engine cycle based on the determined undesired HRR.

DETAILED DESCRIPTION

Figure 1:
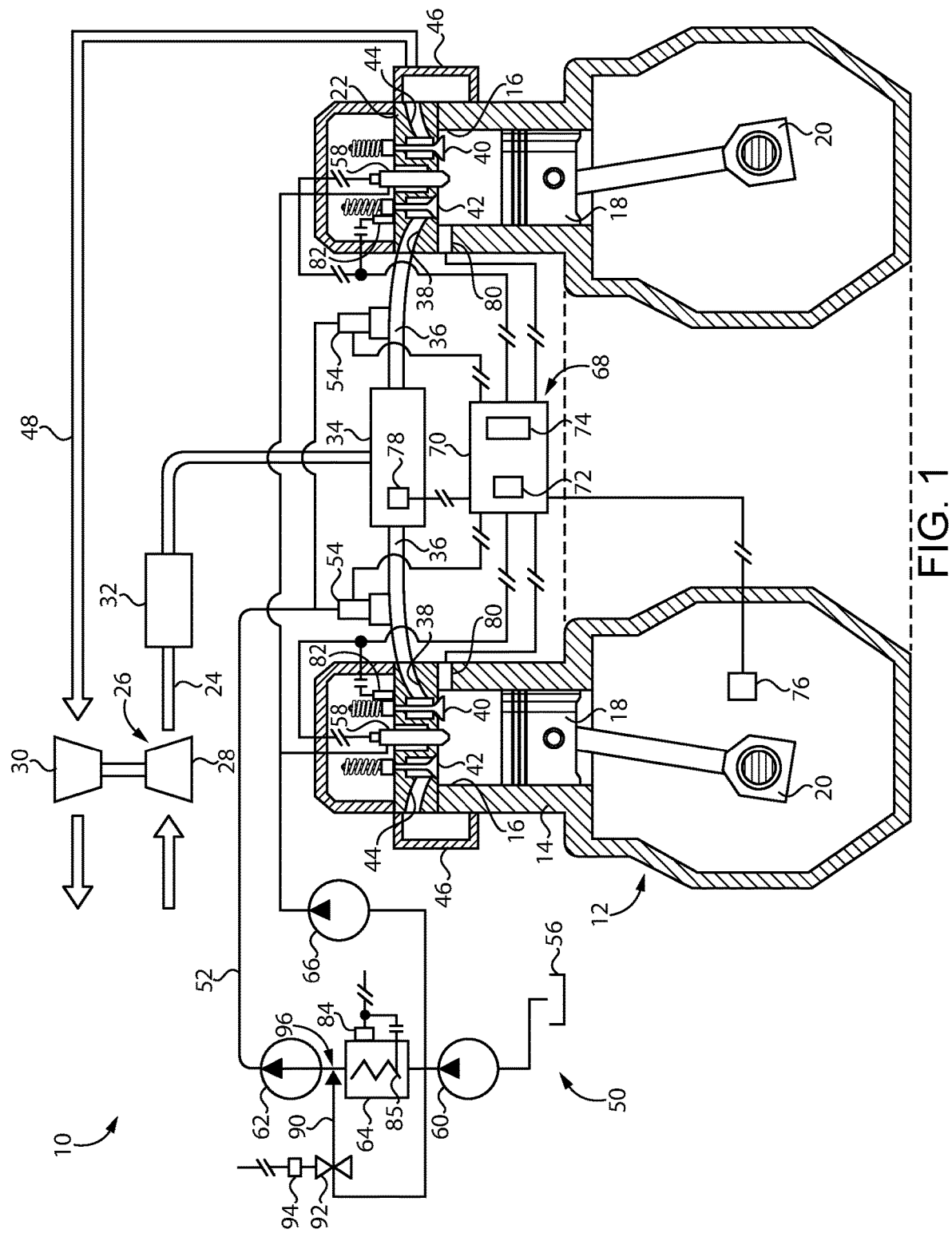
FIG. 1 is a diagrammatic view of an engine system, according to one embodiment.

Referring to FIG. 1, there is shown a dual fuel internal combustion engine system 10, according to one embodiment. Engine system 10 includes an engine 12 having an engine housing 14 with a plurality of combustion cylinders 16 formed therein. A plurality of pistons 18 are positioned in cylinders 16 and each is movable between a top-dead-center position and a bottom-dead-center position in a generally conventional manner. Engine 12 is typically operated in a 4-stroke engine cycle although the present disclosure is not thereby limited. Pistons 18 are coupled to a crankshaft 20 that is rotated to operate a load such as an electrical generator, a compressor, a pump, or a driveline in a vehicle to name a few examples. Cylinders 16 may be of any number in any suitable arrangement such as a V-pattern, an in-line pattern, or still another. An engine head 22 is attached to engine housing 14.

Engine system 10 also includes an intake conduit 24 supplying intake air to a compressor 28 in a turbocharger 26. The intake air is pressurized by way of compressor 28 and fed through an aftercooler 32 to an intake manifold 34. A plurality of intake runners 36 extend from intake manifold 34 to engine head 22. Exhaust from combustion of fuel in cylinders 16 is fed by way of an exhaust manifold 46 to an exhaust conduit 48 and through a turbine 30 of turbocharger 26, again in a generally conventional manner. A plurality of intake valves 42 are supported in engine head 22 and each movable to open and close fluid communication between an intake port 38 extending through engine head 22 and each respective combustion cylinder 16. A plurality of exhaust valves 40 are also supported in engine head 22 and each movable to open and close fluid communication between one combustion cylinder 16 and exhaust manifold 36 by way of exhaust ports 44. Although the present disclosure is not thereby limited, each combustion cylinder 16 may be associated with a total of two intake valves 40 and a total of two exhaust valves 42.

Engine system 10 also includes a fuel system 50. Fuel system 50 includes a first fuel supply 52 for a first fuel, and a plurality of first fuel injectors 54 each positioned at a first fuel injection location of engine system 10 and fluidly connected to first fuel supply 52. Each first fuel injector 54, referred to herein, at times, in the singular, may be arranged as a port fuel injector, such that the first injection location is a port fuel injection location. First fuel injector 54 may be positioned to inject the first fuel directly into, or close to and just upstream of, the respective intake port 38. Fuel system 50 also includes a second fuel supply 56 for a second or main fuel, and a plurality of second fuel injectors 58 each positioned at a second fuel injection location of engine system 10 and fluidly connected to second fuel supply 56. Each second fuel injector 58, also referred to herein, at times, in the singular, may be arranged as a direct fuel injector. The first fuel may be injected into a stream of pressurized intake air fed through intake port 38. "Fed through" intake port 38 means to be fed or having been partially fed. The second fuel injection location includes a direct injection location, such that the second fuel is directly injected into a mixture of the first fuel and pressurized intake air in the respective combustion cylinder 16.

In the illustrated embodiment, first fuel supply 52 is illustrated as a fuel conduit. Thus, the fuel conduit supplies the first fuel. In various implementations, first fuel supply 52 may include not only a fuel conduit but also an accumulator or other storage volume of the first fuel that is not explicitly shown in FIG. 1. Fuel system 50 also includes a fuel pump 60 structured to transfer the second fuel to a high-pressure pump 66 that pressurizes the second fuel to an injection pressure and feeds the same to second fuel injectors 58. Fuel pump 60 also feeds the second fuel to a reactor 64 wherein the second fuel is transformed into the first fuel. Reactor 64 may include appropriate hardware such as a heating element 85 for the transformation of the second fuel into the first fuel. In an embodiment, the first fuel includes a fuel blend including a plurality of liquid fuels, for example an ether, including for example dimethyl ether or DME, and methanol or MeOH, as well as water. The second fuel may include an alcohol fuel, such as or MeOH. Reactor 64 can transform a blend of MeOH and water from second fuel supply 56 by way of a well-known alcohol dehydration process to provide a feed of a fuel blend of DME, MeOH, and water to another fuel pump 62 that pressurizes the fuel blend to an injection pressure for supplying to first fuel injectors 54 from first fuel supply 52. Thus, the first fuel may include a fuel blend of DME, MeOH, and water that is premixed with air before and/or during admitting the first fuel to cylinder 16. The second fuel may include a blend of MeOH and water. Other fuel blends and compositions are nevertheless within the scope of the present disclosure. Moreover, in some implementations the first fuel is not derived from the second fuel at least on-board engine system 10, and the two fuels are independently stored and supplied. The present disclosure is applicable without limitation to the plumbing arrangement, number of fuel storage volumes, number of pumps, valves, or other components in fuel system 50, or processes for making or blending fuels, so long as a supply of two suitable fuels can be provided.

Fuel system 50 may further include a fuel composition valve 92 coupled with an electrical actuator 94 and fluidly connected to second fuel supply 56. Fuel composition valve 92 is movable between an open position and a closed position based on a fuel composition control command further discussed herein. Fuel system 50 also includes a fuel mixing conduit 90 extending from fuel composition valve 92 to a fuel outlet 96. Fuel outlet 96 defines a fuel-fuel mixing location for mixing the main fuel into a feed of a first fuel to first fuel injector 54.

It will be appreciated in view of the example structure illustrated in FIG. 1 that the second fuel can be selectively added to the first fuel output from reactor 64 to obtain a desired composition of the first fuel. In some instances, reactor output can vary such that a blend ratio of the first fuel output from reactor 64 itself can vary. In some instances, a blend ratio of, for example, DME, MeOH, and water, that is produced by reactor 64 can be suboptimal. Reactor output can be manipulated to some extent by adjusting an output of heater 85, for example, or by other means. In some instances, however, reactor output cannot be controllably varied, or cannot be controllable varied fast enough to respond to system needs. Thus, selectively adding MeOH at the fuel-fuel mixing location defined by fuel outlet 96 can enable the blend ratio to be adjusted relatively rapidly on-the-fly. In still other instances, an engine system according to the present disclosure might not utilize a reactor to produce the first fuel at all, and a plurality of liquid fuels forming a fuel blend, or a plurality of liquid fuels stored separately and blended on-board, might be utilized. In such instances, an analogous strategy of selectively supplying a constituent of a fuel blend to achieve a desired blend ratio might be applied. The blending location(s) and still other factors might also vary from those illustrated in FIG. 1. Still other embodiments contemplated herein contemplate obtaining a desired first fuel composition entirely by way of controlling reactor 64 or feedstocks to reactor 64 without supplementation of the main fuel or other fuel constituent to the first fuel at all.

Figure 2:
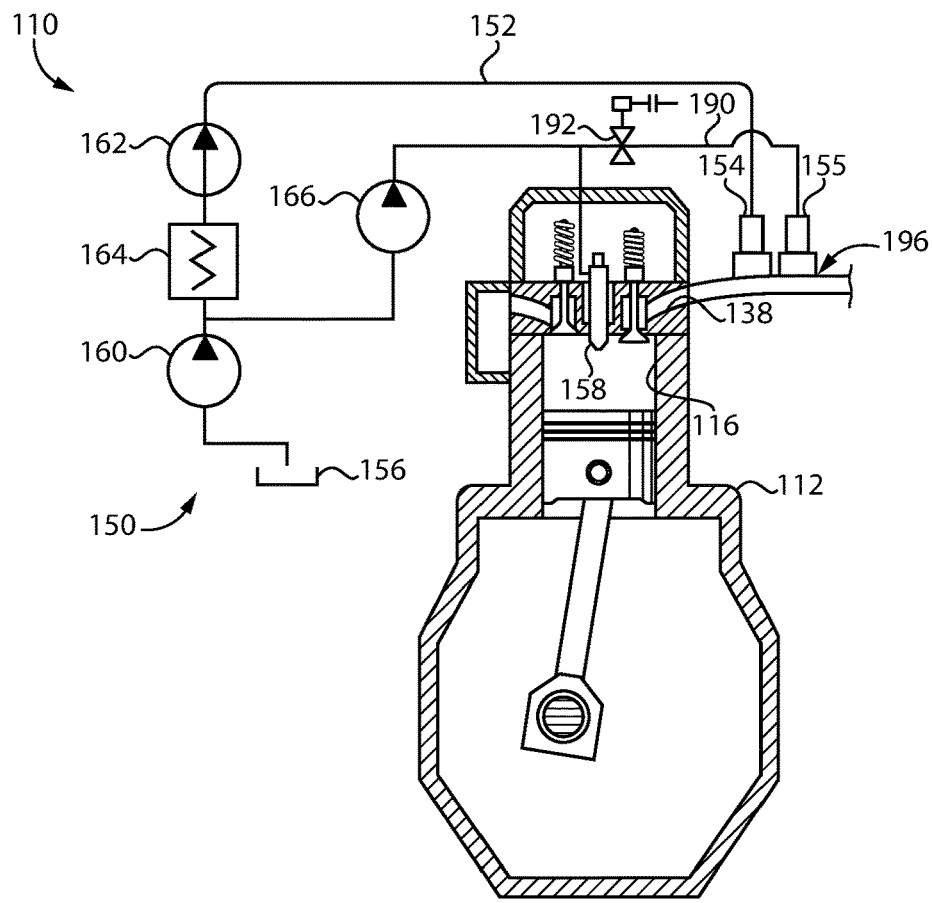
FIG. 2 is a diagrammatic view of an engine system, according to another embodiment.

Turning now to FIG. 2, there is shown an engine system 110 including an engine 112 having a cylinder 116 formed therein, and an intake port 138 extending to cylinder 116. Engine system 110 may be configured in certain respects analogously to engine system 10 discussed above and will be understood to include certain features and functionality analogous to those of engine system 10 discussed above but not specifically illustrated and/or described. Engine 112 includes a fuel system 150 having a first fuel supply 152, and a second fuel supply 156. First fuel supply 152 may contain and convey a first fuel generally analogous to the embodiment described above, and feed the same via a pump 162 from a reactor 164 to a first fuel injector 154. Second fuel supply 156 may contain a second fuel or a main fuel, again generally analogous to the foregoing description of engine system 10 shown in FIG. 1. A pump 166 pressurizes the main fuel and supplies the same to a direct fuel injector 158.

Fuel system 150 also includes a pump 160 fluidly connected to second fuel supply 156 and structured to convey the main fuel to reactor 164, functionally analogous to reactor 64 discussed above, and to a pump 166. Pump 166 pressurizes the main fuel to be supplied to direct fuel injector 158. In the illustrated embodiment, a fuel mixing conduit 190 extends between pump 166 and a fuel composition valve 192, and from fuel composition valve 192 to a fuel outlet 196 defining a fuel-air mixing location. Fuel outlet 196 may be formed by a third fuel injector 155 arranged as a port injector. Third fuel injector 155 is thus fluidly connected to second fuel supply 156 and arranged to inject the main fuel into a stream of intake air fed through intake port 138.

Whereas fuel system 50 can be operated to vary relative amounts of a plurality of liquid fuels by varying a blend ratio of the plurality of liquid fuels, in fuel system 150 varying relative amounts of a plurality of liquid fuels may include varying an injection amount of one of the plurality of liquid fuels injected separately of a liquid fuel blend, into a feed of intake air through intake port 138 to cylinder 116. For example, first fuel injector 154 can be operated to inject a blend of DME, MeOH, and water into a stream of intake air fed through intake port 138, and third fuel injector 155 can be selectively operated to inject MeOH and water into the feed of intake air fed through intake port 138 to provide a desired mixture of DME, MeOH, and water in the first fuel premixed with air and to be autoignited in cylinder 116, as further discussed herein.

Returning now to FIG. 1, engine system 10 further includes a control system 68. It will be understood that the description herein of control system 68 in engine system 10 applies generally analogously to engine system 110 and other engine systems contemplated herein. Control system 68 includes an electronic control unit or fueling control unit 70 having a processor 72 and a computer readable memory 74. Processor 72 can include any suitable programmable logic unit, such as a microprocessor or a microcontroller, that is, or includes, a central processing unit (CPU). Memory 74 includes any suitable volatile or non-volatile computer readable memory such as RAM, ROM, FLASH, a hard drive, or still another. Memory 74 stores computer executable instructions to be executed by processor 72, as well as maps, tables, or other data structures, to carry out the features and functions of the present disclosure. Fueling control unit 70 could include one processor and one memory, and/or multiple processors and/or multiple memories without limitation. Control system 68 may also include an engine timing sensor 76 coupled to fueling control unit 70, such as an engine crank angle timing sensor structured to output an engine timing signal. Control system 68 also includes at least one intake manifold sensor 78 structured to monitor intake manifold pressure or IMAP and intake manifold temperature or IMAT and output corresponding signals to fueling control unit 70. A cylinder pressure sensor is shown at numeral 80. Control system 68 may also include at least one reactor sensor 84 structured to monitor a reactor temperature and a reactor pressure of reactor 64. Control system 68 may also include a plurality of variable valve actuators 82 each coupled to one of intake valves 40 to vary an intake valve closing timing.

Fueling control unit 70 is in control communication with first fuel injector 54 and second or direct fuel injector 58, with first fuel injector 54 and second fuel injector 58 being electrically actuated so as to open and close to controllably inject fuel in response to electrical control signals in a manner that will be familiar to those skilled in the art. In some embodiments, a hydraulically actuated, pneumatically actuated, or mechanically actuated strategy could be used to operate one or both of first fuel injector 54 and second fuel injector 58. Fueling control unit 70 is also in control communication with actuator 94 and potentially heater 85. During at least one mode of operation of engine system 10 a relatively small amount of the first fuel, a fuel blend containing DME, MeOH, and water, for example, is port injected by way of first fuel injector 54 into a stream of pressurized intake air fed through intake port 38. Fueling control unit 70 may be structured to output a first fueling command to first fuel injector 54 to inject the first fuel into the stream of pressurized intake air. Fueling control unit 70 may be further structured to output a second fueling command to direct fuel injector 58 to inject the second fuel directly into the respective combustion cylinder 16 and into a mixture of the first fuel and pressurized intake air therein.

Fueling control unit 70 may be further structured to receive data indicative of an undesired heat release rate (HRR) of combustion of the first fuel in a first engine cycle, and to vary, based on the data, relative amounts of the plurality of liquid fuels injected into the stream of intake air fed to the cylinder in a second engine cycle. In an embodiment, the data indicative of undesired HRR may include cylinder pressure data produced by cylinder pressure sensor 80. Monitoring cylinder pressure in conjunction with engine timing can indicate that heat release is earlier than desired, later than desired, proceeds faster than desired, proceeds slower than desired, more intense than desired, or defines other features of a HRR curve that are undesired. In one example, the undesired HRR can include a multistage or multimodal HRR such as a bimodal HRR, as further discussed herein.

Fueling control unit 70 may be further structured to reduce the undesired HRR of combustion of the first fuel in the second engine cycle based on the varied relative amounts of the plurality of liquid fuels. Put differently, fueling control unit 70 may operate to limit or eliminate features or modalities of HRR that are undesirable and can lead to reduced efficiency of engine system 10 or other undesired operating characteristics. By way of example, a bimodal HRR curve can include an early peak or hump and a later peak or hump, such that the early combustion of the first fuel undesirably opposes a piston moving in a cylinder to compress the fluids in the cylinder. As further discussed herein, varying the relative amounts of the plurality of liquid fuels in the cylinder is observed to drive HRR toward a target HRR in at least some instances. As discussed herein, the varying of the relative amounts may be by way of varying a composition of a fuel blend injected via first fuel injector 54 in engine system 10, or in the case of engine system 110 by way of separately injecting one of the plurality of fuels via third fuel injector 155. In still other instances the varying a composition of a fuel blend could include combinations of these strategies, or separately or in combination including control of reactor 64.

Figure 3:
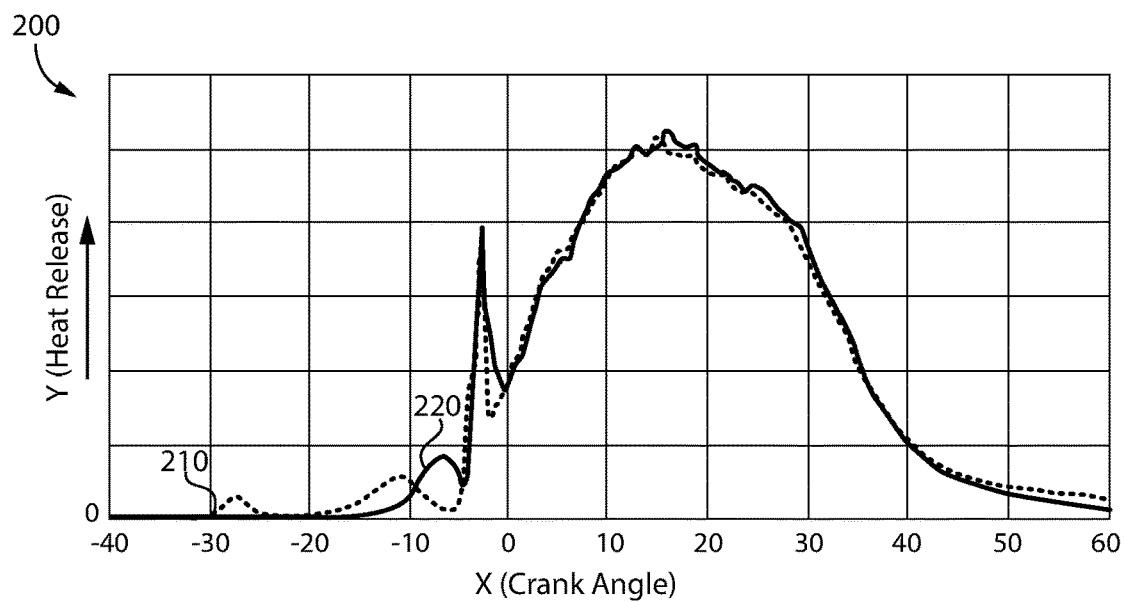
FIG. 3 is a graph illustrating heat release rates for different fuel blends in an engine cycle.

Referring also now to FIG. 3, there is shown a graph 200 illustrating HRR curves in an engine cycle for a first blend ratio of the first fuel at 210 and for a second blend ratio of the first fuel at 220. In the illustrated example, 210 shows HRR for a blend of MeOH:DME:H2O=0.40:0.50:0.10 by mass, and 220 shows HRR for a blend of MeOH:DME:H2O=0.20:0.50:0.30 by mass. It can be noted that 210 includes a first peak or hump beginning around −30 degrees crank angle, and a second peak or hump beginning around −20 degrees crank angle. Trace 220 includes only a single early peak or hump beginning after −20 degrees crank angle. Trace 210 shows an undesired heat release in the form of a bimodal heat release rate curve as well as earlier heat release than what might be considered optimal. Trace 220 shows a desired or target HRR curve where autoignition of the first fuel occurs just prior to ignition of a main fuel triggered by the autoignition of the first fuel.

Thus, for a similar mass fraction of DME in each of the two fuel blends, the fuel blend 210 with a lesser relative proportion of MeOH tends to result in heat release that is earlier in an engine cycle and less smooth than fuel blend 220 with a greater relative proportion of MeOH. A more normalized, single-stage or unimodal, HRR curve with later heat release as in the case of the fuel blend 220 may be more efficient and better controllable. In at least some instances, it may be expected that a MeOH amount of about 30% by mass in a MeOH, DME, and water fuel blend, or less, may be associated with an early two-stage or bimodal ignition as in the case of trace 210. A MeOH amount of about 40% by mass in a MeOH, DME, and water fuel blend, or greater, may be associated with a desirable single-stage ignition as in trace 220. As used herein the term "about" and similar relative terms can be understood to mean generally or approximately as would be understood by a person of ordinary skill in the art, such as within estimation or modeling error, direct measurement error, or conventional rounding. Applying conventional rounding, "about" 40 means from 35 to 44, "about" 35 means from 34.5 to 35.4, and so on. The range of MeOH proportion by mass of about 40% or greater that produces a relatively unimodal HRR curve may be generally consistent across a range of engine operating conditions including ranges of engine loads, engine speeds, cylinder temperatures, and combinations of these.

Figure 4:
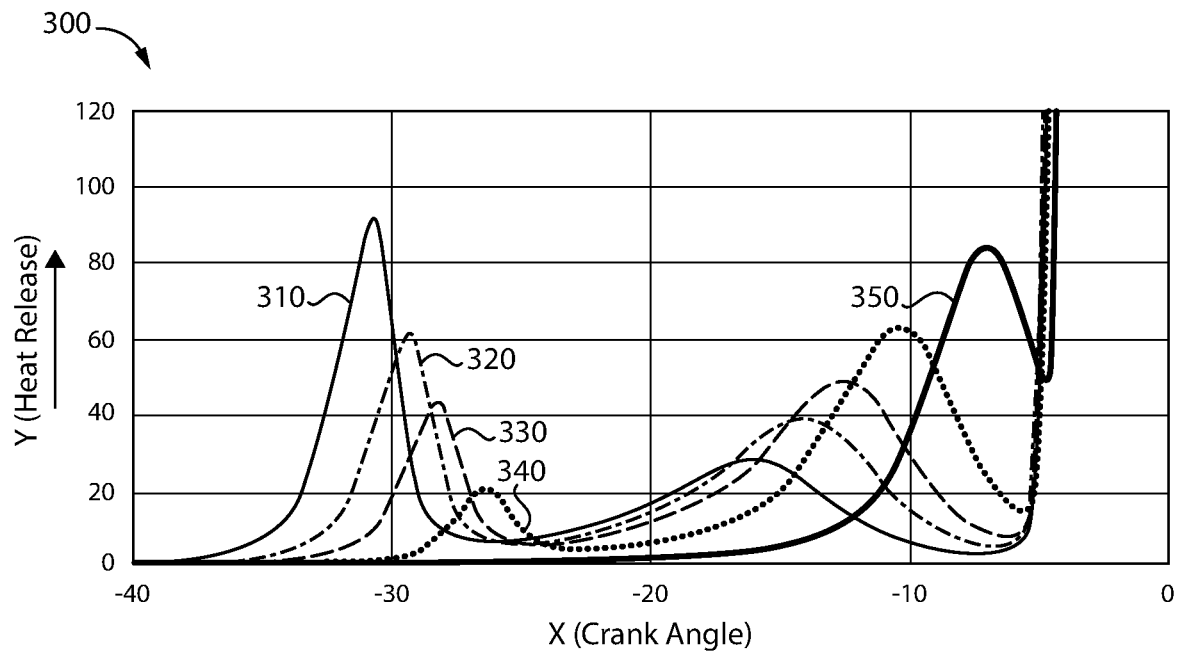
FIG. 4 is another graph illustrating heat release rates for different fuel blends in an engine cycle.

Referring now to FIG. 4, there is shown a graph 300 illustrating HRR curves for another plurality of different fuel blends. Numeral 310 shows a HRR curve for a first fuel of MeOH:DME:H2O=0.00:1.00:0.00 or "neat" DME. Numeral 320 shows a HRR curve for a fuel blend of MeOH:DME:H2O=0.12:0.85:0.03. Numeral 330 shows a HRR curve for a fuel blend of MeOH:DME:H2O=0.20:0.75:0.05. Numeral 340 shows a HRR curve for a fuel blend of MeOH:DME:H2O=0.30:0.625:0.075. Numeral 350 shows a HRR curve for a fuel blend of MeOH:DME:H2O=0.40:0.50:0.10. FIG. 4 demonstrates retarding of heat release and decreased multimodality with an increased relative proportion of MeOH.

Figure 5:
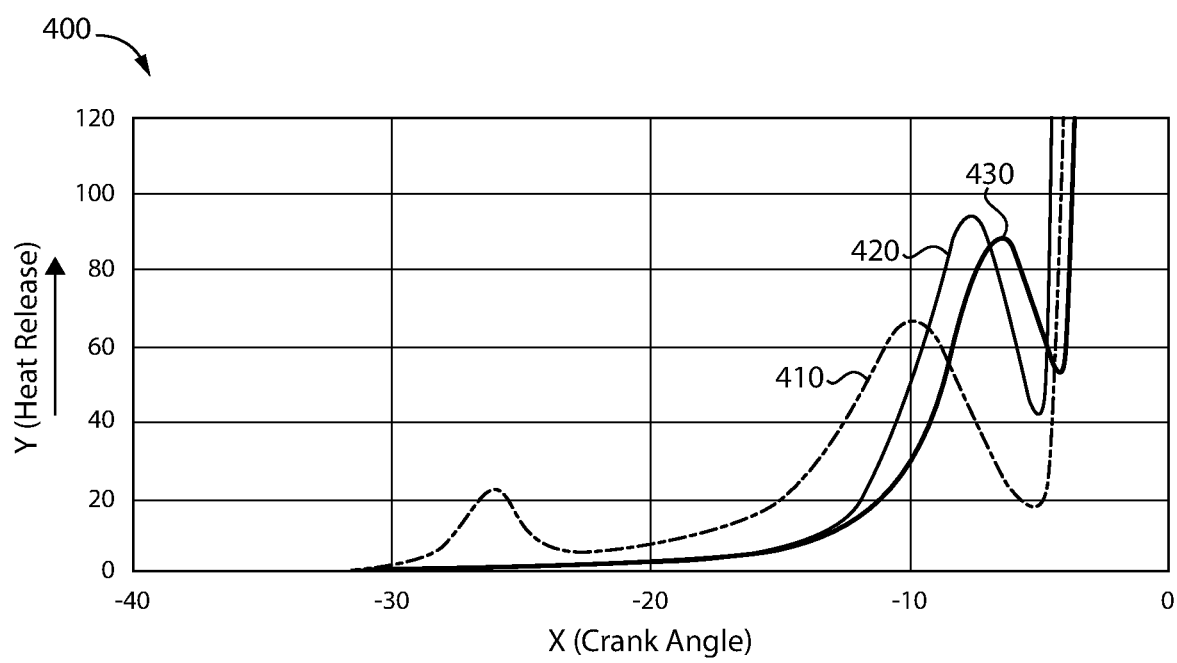
FIG. 5 is yet another graph illustrating heat release rates for different fuel blends, and similar fuel blends where temperature is varied, in an engine cycle.

Referring now to FIG. 5, there is shown another graph 400 illustrating HRR curves for different fuel blends, and including where temperature is varied. Numeral 410 shows a HRR curve for a fuel blend of MeOH:DME:H2O=0.30:0.625:0.075. Numeral 430 shows a HRR curve for a fuel blend of MeOH:DME:H2O=0.40:0.50:0.10. Numeral 420 shows a heat release rate for a fuel blend the same as in numeral 430 where temperature is increased approximately 10 to 20 Kelvins relative to the cylinder temperature used in connection with 430. Put differently, HRR curves 420 and 430 are for the same fuel blend, but where cylinder temperature is higher for 420 relative to 430. The relatively minor difference between HRR curves 420 and 430 shows consistency in desirable HRR properties of the relatively increased MeOH across varied cylinder temperatures.

INDUSTRIAL APPLICABILITY

Figure 6:
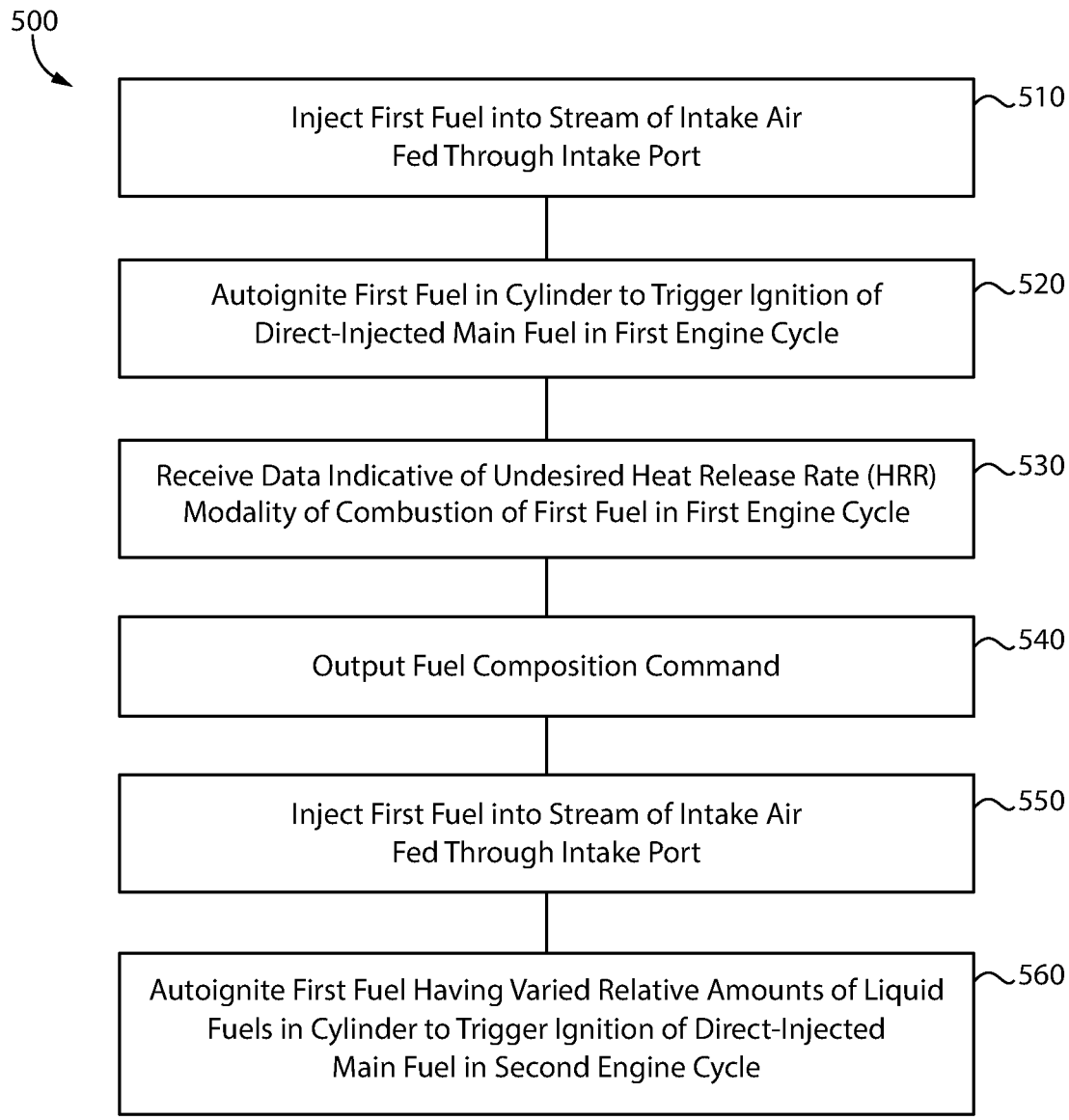
FIG. 6 is a flowchart illustrating example methodology and logic flow, according to one embodiment.

Referring to the drawings generally, but focusing now on FIG. 6, there is shown a flowchart 500 illustrating example methodology and logic flow in operating an engine system according to the present disclosure. In flowchart 500, at a block 510 a first fuel is injected into a stream of intake air fed through an intake port to a cylinder in an engine. The first fuel may have a first fuel composition, including for example a blend of DME, MeOH, and water, where the mass percent of MeOH is less than approximately 40%.

From block 510, flowchart 500 advances to a block 520 to autoignite the first fuel in the cylinder to trigger ignition of a direct-injected main fuel in a first engine cycle. The main fuel may be a blend of MeOH and water as discussed herein. From block 520 flowchart 500 advances to a block 530 to receive data indicative of an undesired HRR modality of combustion of the first fuel in the first engine cycle. From block 530 flowchart 500 advances to a block 540 to output a fuel composition command.

As discussed herein a fuel composition command may include an electrical current control signal outputted by fueling control unit 70 to a fuel composition valve such as fuel composition valve 92, 192 to vary a relative amount of a first one of the plurality of liquid fuels forming the first fuel. As also discussed herein, the varied fuel composition may include an increased relative amount of MeOH. It will also be appreciated that in some instances, a fuel composition command could be outputted to reduce a relative amount of MeOH. Scenarios are contemplated where supplemental MeOH might be provided to limit or eliminate undesired HRR that results from reactor 64 producing a fuel blend that does not have sufficient MeOH justifying supplementing with additional MeOH. The output of reactor 64 might change over time, however, such that the supplemental MeOH becomes unnecessary. The increased relative amount of MeOH may result in approximately 40% by mass or greater of MeOH being admitted to an engine cylinder in an engine cycle.

From block 540, flowchart 500 advances to a block 550 to inject the first fuel into a stream of intake air fed through the intake port. It will be recalled that in the case of the embodiment of FIG. 1 an increased relative amount of the one of the plurality of fuels can be obtained by admitting MeOH into the feed of the first fuel at fuel-fuel mixing location 96. In the case of the embodiment of FIG. 2 an increased relative amount of the one of the plurality of liquid fuels can be obtained by injecting MeOH into the feed of intake air fed through intake port 138. From block 550 flowchart 500 advances to a block 560 to autoignite the first fuel having the varied relative amounts of liquid fuels into the cylinder to trigger ignition of the direct-injected main fuel in a second engine cycle.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine system comprising:
autoigniting a first fuel including a plurality of liquid fuels premixed with air, in a cylinder in an engine, to trigger ignition of a direct-injected main fuel in a first engine cycle;
receiving data indicative of an undesired heat release of combustion of the first fuel in the first engine cycle;
varying, based on the data, relative amounts of the plurality of liquid fuels premixed with air and admitted to the cylinder in a second engine cycle; and
autoigniting the first fuel having the varied relative amounts of the plurality of liquid fuels in the cylinder, to trigger ignition of the direct-injected main fuel in the cylinder in the second engine cycle.

2. The method of claim 1 wherein the first fuel includes a liquid fuel blend injected into a stream of intake air fed to the cylinder.

3. The method of claim 2 wherein the varying relative amounts of the plurality of liquid fuels includes varying a blend ratio of the liquid fuel blend.

4. The method of claim 2 wherein the varying relative amounts of the plurality of liquid fuels includes injecting one of the plurality of liquid fuels separately of the liquid fuel blend into the stream of intake air fed to the cylinder.

5. The method of claim 2 wherein the liquid fuel blend includes an ether, and the direct-injected main fuel includes an alcohol.

6. The method of claim 5 wherein the liquid fuel blend includes dimethyl ether (DME), methanol (MeOH), and water, and the direct-injected main fuel includes MeOH.

7. The method of claim 1 wherein the undesired heat release includes an undesired heat release rate (HRR) modality of a HRR curve.

8. The method of claim 7 wherein the varying relative amounts of the plurality of liquid fuels includes increasing a relative amount of a first one of the plurality of liquid fuels, and further comprising reducing multimodality in a HRR curve of combustion of the first fuel in the second engine cycle.

9. The method of claim 8 wherein the increasing a relative amount of a first one of the plurality of liquid fuels includes increasing a relative amount of MeOH.

10. The method of claim 9 wherein the relative amount of MeOH is increased to approximately 40% by mass or greater.

11. An engine system comprising:
an engine including therein a cylinder, and an intake port extending to the cylinder;
a fuel system including a first fuel supply of a first fuel including a plurality of liquid fuels, a first fuel injector fluidly connected to the first fuel supply and arranged to inject the first fuel into a stream of intake air fed through the intake port, a second fuel supply of a main fuel to be ignited via autoignition of the first fuel, a direct fuel injector fluidly connected to the second fuel supply, and a fueling control unit;
the fueling control unit being structured to:
receive data indicative of an undesired heat release of combustion of the first fuel in a first engine cycle;
vary, based on the data, relative amounts of the plurality of liquid fuels injected into the stream of intake air fed through the intake port, in a second engine cycle; and
reduce the undesired heat release of combustion of the first fuel in the second engine cycle based on the varied relative amounts of the plurality of liquid fuels.

12. The engine system of claim 11 wherein the undesired heat release includes an undesired heat release rate (HRR) multimodality.

13. The engine system of claim 11 wherein the first fuel includes an ether and an alcohol.

14. The engine system of claim 13 wherein the first fuel includes dimethyl ether (DME), methanol (MeOH), and water, and the main fuel includes MeOH.

15. The engine system of claim 14 wherein the varied relative amounts include an increased relative amount of the MeOH.

16. The engine system of claim 15 wherein the increased relative amount of the MeOH includes about 40% MeOH by mass or greater.

17. The engine system of claim 11 further comprising a third fuel injector fluidly connected to the second fuel supply and arranged to inject the main fuel into the stream of intake air.

18. A fuel system comprising:
a first fuel supply for a first fuel including a plurality of liquid fuels;
a first fuel injector fluidly connected to the first fuel supply to inject the first fuel at a first injection location into a stream of intake air fed to a cylinder in an engine;
a second fuel supply for a main fuel;
a direct fuel injector fluidly connected to the second fuel supply to directly inject the main fuel at a direct injection location into the cylinder;
a fueling control unit structured to:
determine an undesired heat release rate (HRR) of the first fuel autoignited in the cylinder; and
output a fuel composition control command to increase a relative amount of one of the plurality of liquid fuels admitted to the cylinder in a second engine cycle based on the determined undesired HRR.

19. The fuel system of claim 18 wherein the one of the plurality of liquid fuels includes the main fuel blended with at least one other fuel to form the fuel blend.

20. The fuel system of claim 19 further comprising:
a fuel composition valve fluidly connected to the second fuel supply, and movable between an open position and a closed position based on the fuel composition control command; and
a fuel mixing conduit extending from the fuel composition valve to a fuel outlet defining one of a fuel-fuel mixing location for mixing the main fuel into a feed of the first fuel to the first fuel injector, or a fuel-air mixing location for mixing the main fuel into the feed of intake air fed to the cylinder.

* * * * *